United States Patent [19]

Marshall

[11] Patent Number: 4,895,449
[45] Date of Patent: Jan. 23, 1990

[54] GAUGE FOR MEASURING ACROSS-SECTIONAL DIMENSION DENIATION ON AN ELONGATE OBJECT

[75] Inventor: Joseph W. Marshall, East Knighton, England

[73] Assignee: British Steel plc, London, England

[21] Appl. No.: 235,167

[22] Filed: Aug. 23, 1988

Related U.S. Application Data

[63] Continuation of Ser. No. 758,390, Jul. 24, 1985, abandoned, which is a continuation-in-part of Ser. No. 607,405, May 7, 1984, abandoned, which is a continuation of Ser. No. 17,462, Mar. 5, 1979, abandoned.

[30] Foreign Application Priority Data

Mar. 9, 1978 [GB] United Kingdom .................. 938878

[51] Int. Cl.⁴ ...................... G01B 11/10; G01N 21/88

[52] U.S. Cl. .................................. 356/386; 356/385; 250/562

[58] Field of Search ............... 356/385, 376, 386, 387, 356/394, 398, 429, 430; 250/559, 560, 562

[56] References Cited

U.S. PATENT DOCUMENTS 3,461,299 8/1969 Felix .
3,947,129 3/1976 Wiklund .

*Primary Examiner*—Rodney B. Bovernick
*Attorney, Agent, or Firm*—Bacon & Thomas

[57] ABSTRACT

An apparatus and method for measuring a cross-sectional dimension or deviation from a predetermined shape of an elongated moving object. The apparatus is rotated about the object and includes a light source and photo-diode array. By continuous rotation of the apparatus about the object, deviations in the cross-sectional dimension are determined.

10 Claims, 3 Drawing Sheets

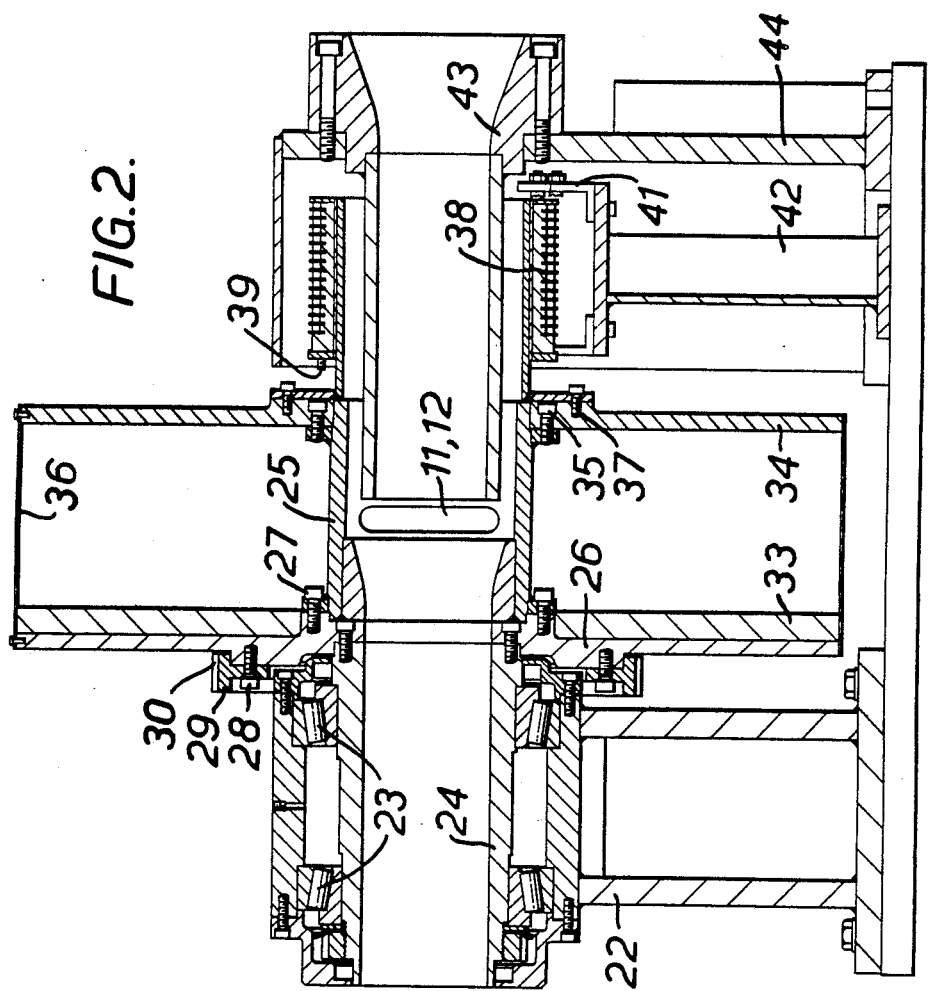

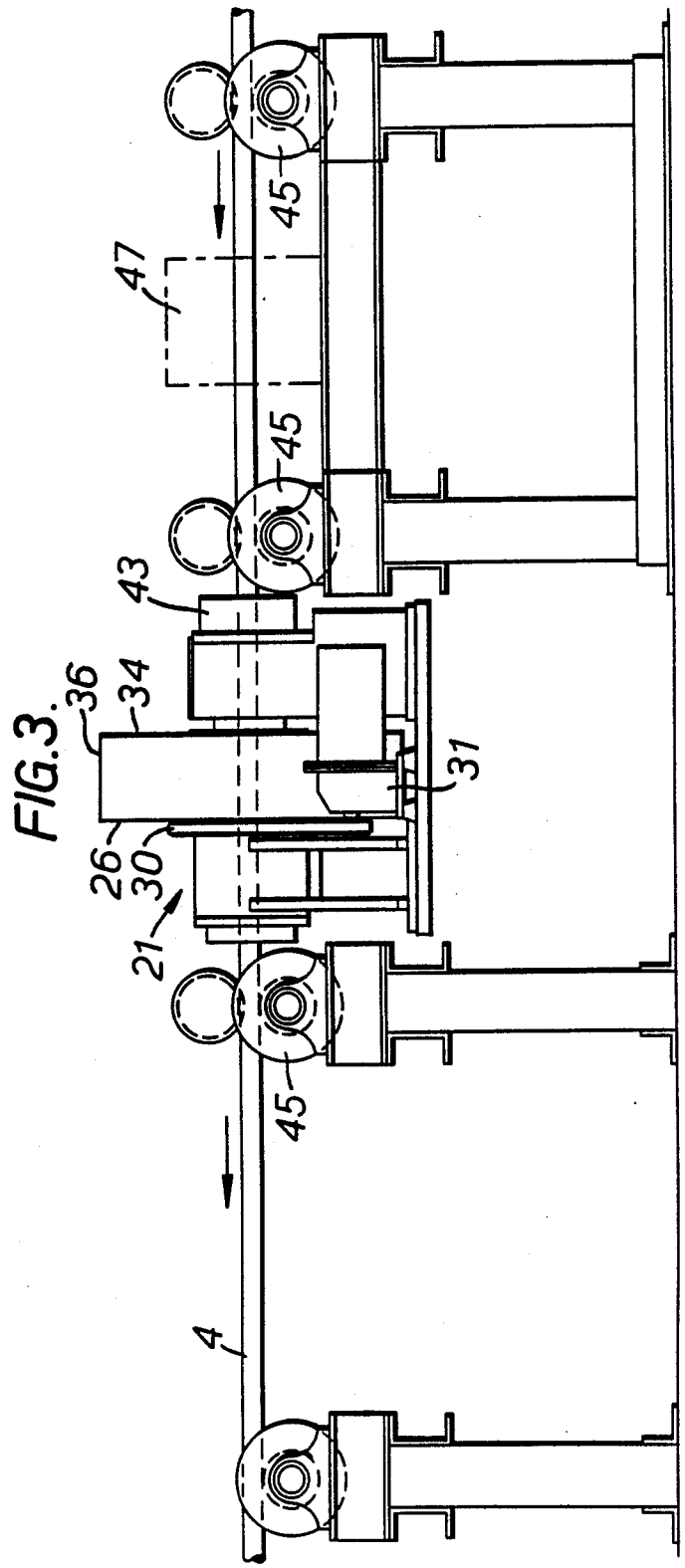

GAUGE FOR MEASURING ACROSS-SECTIONAL DIMENSION DENIATION ON AN ELONGATE OBJECT

This application is a continuation of Ser. No. 06/758,390 filed July 24, 1985; is a continuation of Ser. No. 06/017,462 filed Mar. 5, 1979 all now abandoned.

This invention relates to apparatus for and method of detecting or measuring a cross-sectional dimension or deviation from a pre-determined shape or cross-sectional dimension of an elongate object. More especially the invention relates to a gauge for measuring an overall cross-sectional dimension and/or straightness of elongate metal objects such as billets, bar or rod.

According to one aspect of the present invention, there is provided a gauge for detecting or measuring a cross-sectional dimension or deviation from a pre-determined shape or cross-sectional dimension of an elongate object moving relative to the gauge, comprising a tubular housing, means for rotating the housing about the intended path of objects to be gauged, a light source and collimating means mounted on the housing and positioned to direct a collimated beam of light towards and onto objects moving along the aforesaid path of travel, a photo diode array mounted on the housing at a location diametrically opposed to the light source and comprising a multiplicity of individual photo diodes which are sequentially scanned to produce a series of discrete electrical signals representative of the actual sizes and spatial positions of the real object images received by the array at particular moments in time, and signal processing means connected to receive the a foresaid electrical signals and to provide outputs corresponding to the aforesaid parameters to be detected or measured by the gauge.

According to the present invention in a further aspect, there is provided a method of detecting or measuring a cross-sectional dimension or deviation from a pre-determined shape or cross-sectional dimension of an elongate object moving relative to the gauge comprising the steps of directing a collimated beam of light from a light source towards the moving object to form on a aphoto diode array real images of the object and sequentially scanning the individual photo diodes of the array to produce series of discrete electrical signals from which such cross-sectional dimension or deviation is derived, and rotating the light source and the photo diode array together about the path taken by the object.

The gauge may be employed for measuring dimensions or deviations from predetermined shapes or cross-sectional dimensions of metal rod or bar of various cross-sections emerging from a rolling mill. Thus, rods or bar which are, for example, square, hexagonal, diamond or oval in cross-section, may be measured by gauges in accordance with the invention. Additionally or alternatively, the gauge may be employed to detect the straightness of metal rod or bar. In this latter arrangement the bar is supported both upstream and downstream of the gauge to ensure that a bar, if straight, would pass along substantially the longitudinal axis of the opening of the cylindrical housing.

The invention will now be described by way of example only with reference to the accompanying diagramatic drawings in which:

FIG. 2 is a side elevational view in section of a gauge in accordance with the invention;

FIG. 3 is a side elevation view of the gauge illustrated in FIG. 2 in its operating position.

Figure 1:
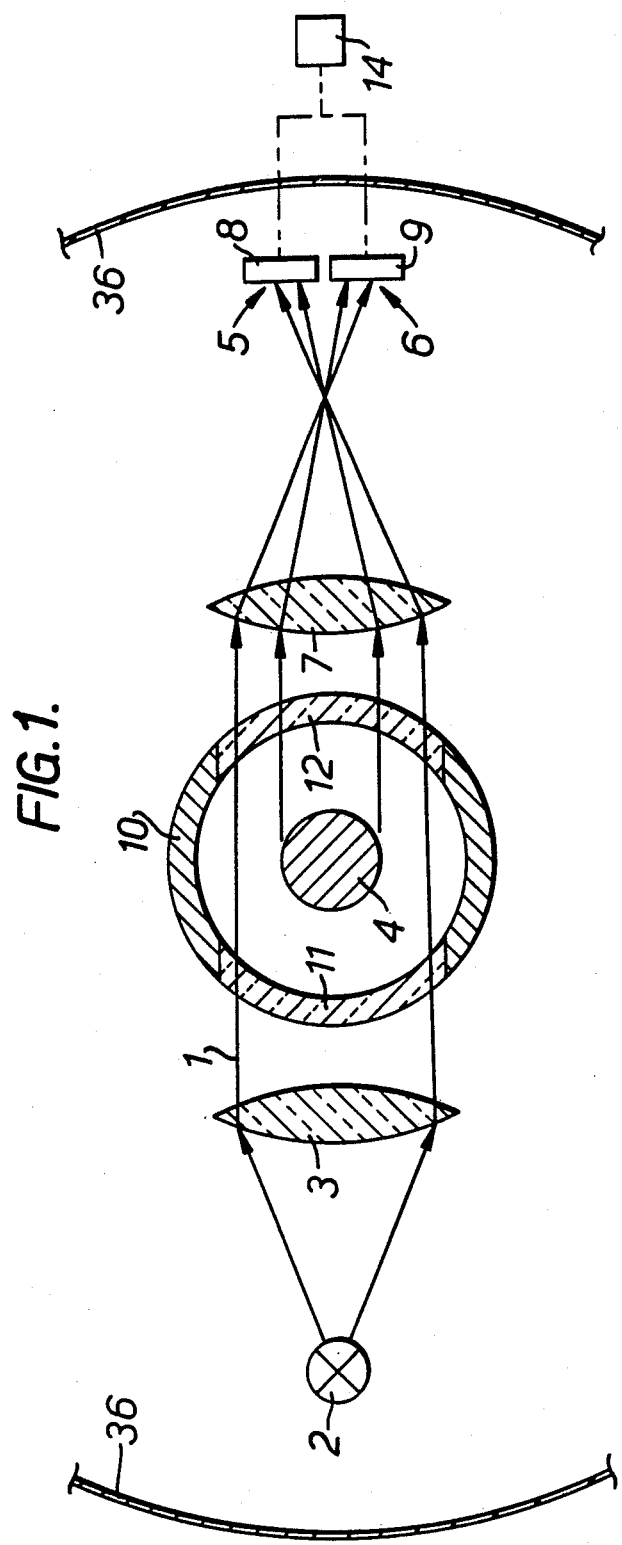
FIG. 1 is a schematic cross-sectional view of a gauge in accordance with the invention.

In the gauge illustrated in FIG. 1, a continuous or pulsed collimated beam of light 1 from a tungsten filament lamp 2 is directed through a condenser lens 3 towards a moving bar 4 to produce images of opposiste boundary portions of the bar 4. The images 5 and 6 are directed by a lens 7 onto two photo diode arrays 8 and 9 each comprising a multiplicity of individual photo diodes which are sequentially scanned and each connected by electrical circuitry to an electronic processing unit 14 giving discrete output signals representative of the size and/or the straightness of the bar 4 scanned by the collimated light beam 1.

The lamp 2, lenses 3, 7 and photo diode aarrays 8, 9 are all mounted on a tubular housing 10 through which the bar 4 can pass, the lamp and photo diode arrays being diametrically oppsoed. Optically flat glass windows 11, 12 are provided in the inner weaall of the housing 10 to facilitate illumination of the bar 4 as it passes through the central opening 12 of the housing 10. The housing 10 is mounted for rotation about its longitudinal axis to provide a helical scan of the bar periphery as it travels through the central cavity of the housing 10. For a bar of diameter within a range of 20–80 mm a suitable rotational speed for the housing would be 100 rpm giving a complete cycle of gauging around the bar approximating to 250 mm of bar length for a bar speed 50 meters/minute.

In situations where movement of the bar 4 in planes normal to its direction of travel is restricted, a continuous collimated light beam may be employed. However, where such movement is unrestricted, a pulsed collimated light beam is employed effectively to freeze the position of the bar as a measurement is made. In both cases, a series of discrete object measurements is produced and passed to the electronic processing unit 14. Accumulating these successive discrete measurements at regular angular increments as the housing rotates enables the complete shape or cross-sectional dimension of the object to be measured.

Reference will now be made to FIGS. 2 and 3 in which like integers to those described with reference to FIG. 1 bear the same reference numerals. The gauge illustrated includes a cylindrical gauge tube 21 mounted for rottaion on a fixed stand 22 through two roller bearing assemblies 23. The gauge tube is formed in two sections, an exit section 24 positioned above the stand 22 and on entry sesction 25 spaced from the exit section by an annular steel plate 26 and secured to the plate by screws 27. The plate 26 is, in turn, secured to the exit section 24 by screws 28 and carries on its rearwardly facing face an annular pulley 29 which co-operates with an endless belt 30 driven by an electric motor 31 (FIG. 3) to rotate the cylindrical gauge tube 21 about its longitudinal axis.

Secured to the forwardly facing face of the plate 26 is an annular aluminium mounting plate 33 which carries the light source 2, the two lenses 3, 7 and the photo diode ararays 8, 9; the lens 7and the diode arrays 8, 9 are so positioned that they aare diametrically opposed to the light source 2 and the lens 3, the collimated light beam passing from the light source 2 to the diode arrys 8, 9 through the optically flat glass windows 11, 12 which are set in opposite sides of the entry section 25 of the gauge tube 21.

The end of the entry section 25 remote from the exit section 24 carries an annular steel plate 34 of the same internal and external diameters to those of the plate 26. The plate 34 is secured to the entry sesction 25 by screws 35. The spacing between the two plates 26, 34 is closed off by a cover 36 secured by screws to the respecive outer rims of the two plates. Secured by screws 37 to the outwardly facing face of the steel plate 34 is a rotational slip ring assembly 38 connected to supply electrical power to the lamp 2 and to receive discrete electrical signals via an electrical connection 39 from the scanned diode arrays 8, 9 and to pass these signals to the electronic processing unit 14. The stationary housing 41 of the slip ring assembly 18 is supported on a hollow fixed satnd 42, electricaal wiring from the assembly 38 passing downwardly through the hollow stand 42 to the electronic processing unit 14.

A stand 44 also supports a stationary entry guide funnel 43 through which metal bar to be gauged passes aas it travels towards the gauge tube 21. The guide funnel 43 protrudes into the adjacent end of the entry section 25 of the gauge tube 21 to a position just upstream of the windows 11, 12.

As will be seen from FIG. 3, the bar to be gauged is supported by diablo rollers 45 located both upstream and downstream of the gauge and positioned so that the bar, if straight, will pass through the gauge with its longitudional axis substantially coincident with that of the gauge tube 21.

A further electronic processor 47 is positioned to receive signals from the gauge representatve of the measured cross-sectional dimension of the bar passing through the gauge tube 21. Signals received by the processor are compared with a standard reference signal representative of the error between the measured and standard reference signal.

It is to be understood that alternative light sources (eg a laser diode) to the tungsten lamp described above may be employed to produce the light beam 1.

In operation of the gauge described, bar to be gauged passes along the path indicated by broken line in FIG. 3. The diablo rollers are so positioned that a straight bar of pre-determined diameter will pass through the gauge tube 21 of the gauge with its longitudional axis substantially coincident to that of the gauge tube. The bar enters the gauge through the entry guide funnel 43 and passes through the gauging tube 21. As it passes the windows 11, 12 the bar periphery is illuminated by the collimated light beam 1 from the tungsten lamp 2, images of opposite boundary portions of the illuminated bar being received by the photo diode arrays 8, 9 whose individual and photo diodes are sequentially scanned. The sizes and positions of the real image sreceived are employed to provide information concernign the size, shape and straightness of the bar being gauged. The diameter of the bar at any given time is determined by summing the number of diodes in the bar shadow during one scan and the distance separating the two diode arrays. Deviations from a predetermined diameter can readily be detected by comparing the measured values with a standard value representative of the required bar diameter.

Ovality in the bar will produce a cyclic change in the image size received by each photo diode array 8, 9 in turn while a variation in bar straightness will produce a cyclic change in the positions of the images received by both photo diode arrays.

Because changes in bar straightness will produce identical cyclic variations in the images received by the photo diode arrays to those which would be produced upon an overall change in bar diameter due to consequent movement of the longitudinal axis of the gauging tube 21, a train of discrete signals representative of measured bar diameters are passed to the processor 47, output signals from which are used to compensate the bar straightness measurement automatically for changes in the measured bar diameter.

Upon deviation in bar dimension, bar shape or bar straightness being detected by the gauge, any one of a numbre of warning or indicating systems may be brought into play to alert the attention of the operataor or to mark the defective portion of the gauged bar.

It is to be understood that the invention has application for gauging elongate objects other than metal objects.

I claim:

1. A gauge for detecting or measuring a cross-sectional dimension or deviation from a pre-determined shape or cross-sectional dimension of elongate objects moving relative to the gauge comprising a tubular housing, means for rotating the housing continuously about the intended path of objects to be gauged, a light source and collimating means mounted on the housing and positioned to direct a collimated beam of light towards and onto objects moving along the aforesaid path of travel, a photo diode array mounted on the housing at a location diametrically opposed to the light source and comprising a multiplicity of individual photo diodes which are sequentially scanned on rotation of the housing to produce a series of dicrete electrical signals representative of the actual sizes and spatial positions of the real object images received by the array at particular moments in time, and signal processing means connected to receive the aforesaid electrical signalsl and to provide outputs corresponding to the aforesaid parameters to be detected or measured by the gauge.

2. A gauge as claimed in claim 1 in combination with diablo rollers located both upstream and downstreeam of the gauge and positioned so that an elongate object to be gauged, if straight, will pass through the tubular housing of the gauge with its longitudional axis substantially coincident with that of the tubular housing.

3. A gauge as claimed in claim 1 or claim 2 wherein a pulsed light sourse is employed.

4. A method of detecting or measuring a cross-sectional ddimension or deviation from a pre-determined shape or cross-sectional dimension of an elongate object moving relative to a gauge, comprising the steps of directing a collimated beam of light from a light source towards the moving object to form on a photo diode array real images of the object, sequentially scanning the individual photo diodes of the array to produce series of discrete electrical signals from which such cross-sectional dimension or deviation is derived, and continuously rotating the light source and the photo diode array together about the path taken by the object.

5. A method as claimed in claim 4 further comprising the step of supporting the objects both upstream and downstream of the gauge in such manner that the objects, if straight, travel along a path which is substantially coincident with the axis of rotation of the light source and the image sensing means.

6. The method as claimed in claim 4, wherein said elongate object is square in cross-section.

7. The method as claimed in claim 4, wherein said elongate object is hexagonal in cross-section.

8. The method as claimed in claim 4, wherein said elongaate object is diamond in cross-section.

9. The method as claimed in claim 4, wherein ssaid elongate object is oval in cross-section.

10. The method as claimed in claim 4, wherein the continuous rotation of the light source and the photo diode array about the path taken by the object provides a helical scan of the periphery of the object.

* * * * *